Nov. 16, 1937. R. R. FRISSELL 2,099,058
INFLATABLE ARTICLE AND PROCESS OF PRODUCING THE SAME
Original Filed March 13, 1935
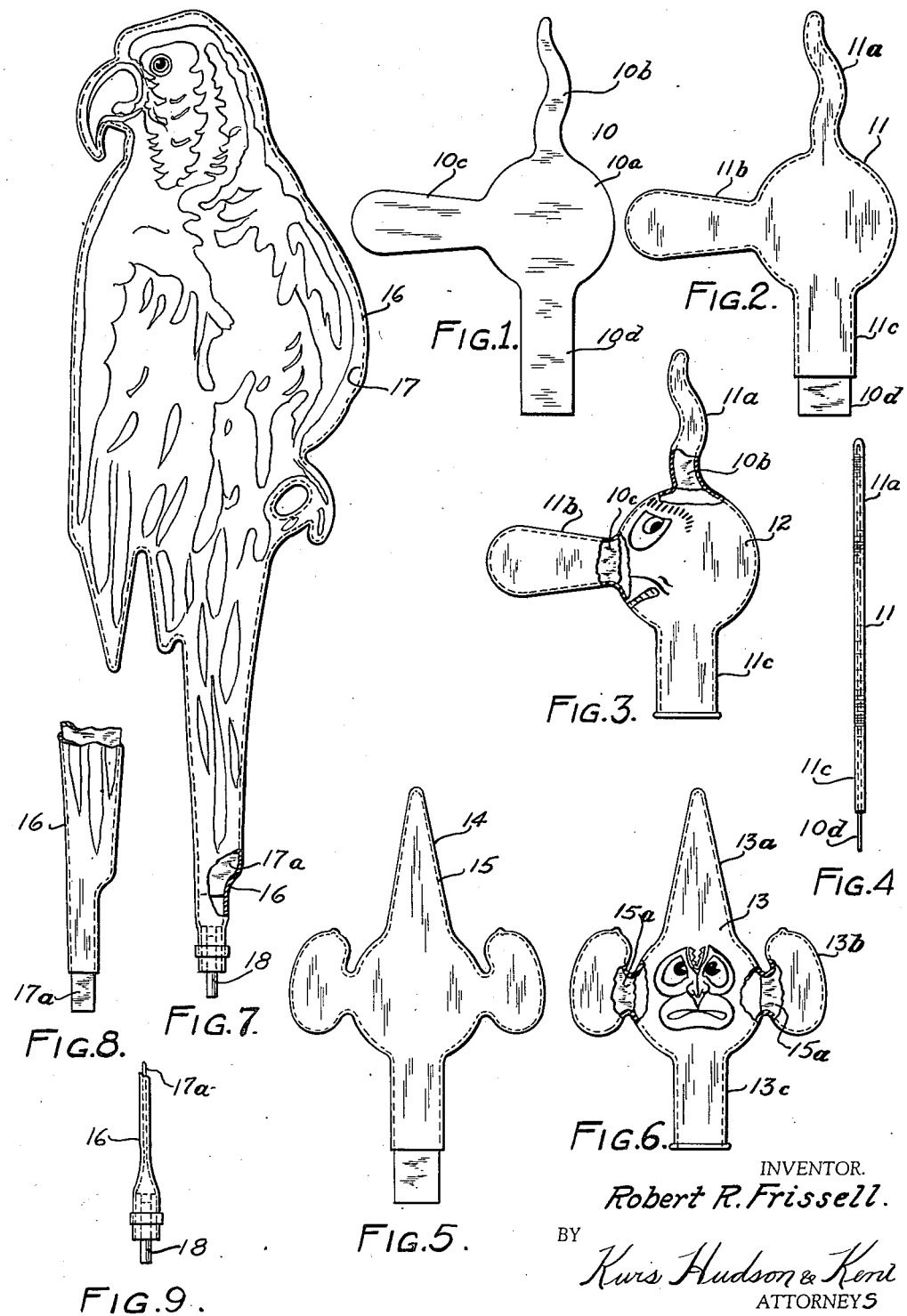
INVENTOR.
Robert R. Frissell.
BY
Kurs Hudson & Kent
ATTORNEYS Patented Nov. 16, 1937

2,099,058

UNITED STATES PATENT OFFICE 2,099,058

INFLATABLE ARTICLE AND PROCESS OF PRODUCING THE SAME

Robert R. Frissell, Sandusky, Ohio, assignor to The Barr Rubber Products Company, Sandusky, Ohio, a corporation of Ohio Application March 13, 1935, Serial No. 10,829
Renewed April 7, 1937

9 Claims. (Cl. 18—58)

This invention relates to an inflatable article and to the process of producing the same, and is an improvement on the inflatable article and process described in the pending applications filed in the name of John J. Lee Serial No. 698,646 and Serial No. 736,921.

In these applications there is disclosed a process of producing inflatable rubber articles, wherein there is utilized a flat, flexible form having one or more extensions including one by which the form is supported while being dipped into latex or other suitable solution so that the form will be entirely coated with rubber, except a portion of the supporting extension. After the rubber is cured, the article is stripped from the form which is removed through the opening formed by the supporting extension.

As disclosed in the Lee applications, these flat flexible forms were designed to be made from destructible material, such as paper, or from material relatively indestructible, such as rubber. Each of these materials has its advantage over the other, the rubber forms being less expensive inasmuch as they can be used repeatedly, whereas the paper forms, while intended to be used for only one immersion, are adapted to a wider range of shapes and designs of rubber articles to be produced, including some which require the breaking of the form at one or more points to permit its removal from the rubber article, as, for example, an article having an opening extending therethrough and wholly within its margin.

I have discovered further advantages derived from the use of the initially inexpensive forms of the flat, flexible type such as paper, resulting in certain improvements in the formed articles.

In brief, I have found that in many instances the formed article is improved if part or practically all of the form is left in the article. This is particularly true of articles having considerable irregularity in outline, such as widely caricatured animate objects and others. When the form or portions thereof are left in the article, they do not interfere at all with the inflation of the article but have the advantage that the article or such portions thereof in which the form is left will have practically the same shape after inflation as before inflation, with the additional advantage that the article has longer life by reason of the fact that, in an uninflated state, the article or portions thereof are retained in flat condition and are therefore less likely to crack and break.

The invention may be further briefly summarized as consisting in certain novel details of the formed inflatable articles, as well as certain novel steps in the process of producing the same.

In the accompanying sheet of drawings wherein I have shown several forms and rubber articles produced thereon to illustrate various phases of the invention, Fig. 1 is a face view of a flat, flexible form made of paper or other readily severable or destructible material.

Fig. 2 shows the form and the raw article produced thereon by the dipping process.

Fig. 3 shows the finished rubber article with portions broken away to show parts of the form which are left in certain appendages of the article.

Fig. 4 is an edge view of Fig. 2.

Figs. 5 and 6 are views similar to Figs. 2 and 3, showing a different article and a different form used in producing the article.

Fig. 7 shows a rubber article with the entire form left therein except a small portion of the supporting extension of the form which has been removed to permit the insertion of an inflating device.

Fig. 8 is a fragmentary view of the lower part of the article of Fig. 7 showing how the extension appeared before the lower end was broken off for the insertion of the inflating device, and Fig. 9 is an edge view of the lower part of Fig. 7.

In Fig. 1 I have shown at 10 a form which is flat and flexible and formed of readily severable material, such as paper, having a certain degree of stiffness. This form, which as appears from Fig. 3 is used in forming a caricatured human head, includes a body portion 10a with two appendage-forming extensions 10b and 10c and a supporting extension 10d. In Fig. 2 I have shown at 11 the raw or undecorated rubber article which is produced on the form 10 by the dipping process, the appendage-forming extensions 10b and 10c being wholly enclosed or covered by the appendages 11a and 11b, and the supporting extension 10d being partially covered by the neck 11c which subsequently forms the inflating part of the article.

In Fig. 3, there is shown at 12 the completed article, this article being suitably decorated after it has been cured on the form. Instead of removing the entire form through the neck 11c, I leave in the appendages 11a and 11b the two extensions 10b and 10c of the form. This is done by breaking off these extensions from the body of the form so as to leave them in the appendages referred to, and withdrawing the remainder through the neck 11c. By leaving these extensions of the form in the appendages, the desired shape of the appendages is retained after inflation, and at the same time they do not interfere with the inflation of the article, including the appendages. Additionally, as previously remarked, by leaving the extensions in these appendages they are retained in a flat condition when the article is not inflated, thus reducing the likelihood of the rubber cracking and leaking. The fact that the form is made of paper makes it a simple matter for the workman to break off the extensions from the body portion of the form before removing the remainder of the form. Incidentally, it reduces the cost of stripping.

In Fig. 6 I have shown a rubber article 13 which is also a caricatured face, this article having a head appendage 13a and ear appendages 13b and an inflating neck 13c. In Fig. 5 the raw article is shown at 14 on the form 15 which is made of relatively thin paper or other destructible material as is the form of Fig. 1. In this instance, when the form is removed from the article there is left in the ear appendages 13b of the article the ear-forming extensions 15a of the form, these being readily broken off from the body portion of the form 15 before the remainder of the form is removed through the neck 13c.

In all instances where the extensions of the forms are broken off and left in the appendages of the rubber article, they remain in place when the articles are inflated as well as when deflated, the shape of the appendages and of the enclosed form extensions being such that the latter cannot slip out of place regardless of whether or not the article is inflated. I wish to emphasize at this point that an important advantage of leaving the extensions of the form in these appendages is the fact that the shape and facial expression predetermined by the designing artist and determined by the shape of the form and by the subsequent decorations, are maintained during inflation, and this permits the formation of a greater variety of interesting and amusing articles than would otherwise be the case, for, in many instances, there would occur during inflation distortions which would detract from or destroy the intended effect and therefore detract from the popularity and salability of the articles, whereas when portions of the form are left in the appendages, the latter will be inflated without any substantial distortion.

In Figs. 7, 8, and 9 I have shown a rubber product produced in the same manner as previously explained, with a flat, flexible form of the kind described above, but wherein the inventive idea disclosed in Figs. 1 to 6 is extended by leaving practically the entire form in the article, the inflatable rubber article being designated 16 and the form being shown therein by dotted lines at 17. After the article is produced by the dipping process and is cured on the form 17, the workman simply breaks off and removes a short section of the extension 17a of the form, only a sufficient length of the extension being broken off and removed to permit the insertion of the inflating device 18. By leaving the entire form (other than the short section which is removed) in the article, the latter is retained at all times when deflated in flat condition, the desired shape and contour are retained when the article is inflated, and the form does not at all interfere with the inflating of the article or any part thereof and it does not detract from the appearance of the article after it is inflated. These advantages are attained to a maximum degree, especially as the formed articles of the type now under consideration are intended to be inflated without substantial distortion and without substantial stretching of the rubber. Additionally, it might be mentioned that, by leaving all or substantially all the form in the article, the expense of stripping is avoided and therefore the cost of producing these articles is decreased.

By way of explanation of the above statement that the form or portions of the form left in the inflatable article do not interfere with its inflation, I might state that, by applying a suitable powder to the form before it is dipped, the rubber which is applied to the form in the dipping process does not adhere to the form. This is preferably done by mixing the powder in a suitable coagulant and immersing the form in the coagulant before the dipping process, the function of the coagulant being, as is well understood, to cause the rubber to promptly coagulate on the form, and the function of the powder being to prevent the formed article sticking to the form.

It was mentioned above that the forms are dipped in latex or other suitable solution, and, in this connection, I might state that natural latex or artificial latex may be used very advantageously, and, in fact, it is not unlikely that other solutions containing organic substances other than rubber, such as synthetic rubber, may be used, and therefore the term "rubber" as used herein is intended to cover natural rubber or any equivalent thereof.

While I have shown only three different types or designs of articles embodying the present invention, it will be understood that these are merely typical of an almost infinite number of designs and shapes to which the present invention in one or more of its embodiments can be applied advantageously.

Having thus described my invention, I claim:

1. An inflatable article produced by dipping a form in a suitable solution, said article having an appendage with the appendage-forming portion of the form therein.

2. An inflatable article produced by dipping a form in a suitable solution, said article being flat when deflated and having portions of the form retained therein to maintain corresponding portions of the article in substantially their original shape but permitting inflation thereof.

3. A substantially flat inflatable article produced by dipping a substantially flat form of predetermined shape in a suitable solution, said article having a part of the form retained therein so that the form-enclosing portion of the article is maintained in flat condition when the article is deflated and may be inflated without substantial distortion.

4. An inflatable article which is substantially flat when deflated and formed by dipping a substantially flat flexible form of predetermined shape into a suitable solution, said article having the form retained therein but non-adherent to the article so as to permit inflation thereof without material distortion.

5. The process of making inflatable articles which comprises dipping a substantially flat flexible form into a suitable solution and leaving in the article when cured one or more portions of the form so that corresponding portions of the article will be maintained in substantially their original shape during inflation.

6. The process of making inflatable articles which comprises dipping a substantially flat flexible form of predetermined shape into a suitable solution so as to form a coating thereon which when cured is non-adherent to the form, and leaving the form therein so that when inflated the article will be retained in substantially its original shape.

7. An inflatable article produced by dipping a form in a suitable solution, said article in its completed condition having an appendage with the appendage-forming portion of the form retained therein.

8. The process of making inflatable articles which comprises dipping a substantially flat flexible form into a suitable solution, severing the form into parts while contained in the article, and removing one of said parts from the article but leaving another of said parts therein for substantially maintaining the shape of the corresponding portion of the article.

9. The process of making inflatable articles which comprises dipping into a suitable solution a substantially flat flexible form having a body portion and an appendage, severing the appendage from said body portion while the form is at least partially contained in the article, and removing the body portion of the form but leaving the appendage permanently in the corresponding portion of the article.

ROBERT R. FRISSELL.